United States Patent
Kindkeppel et al.

(10) Patent No.: US 10,112,138 B2
(45) Date of Patent: Oct. 30, 2018

(54) FILTRATION SEALING SYSTEM

(71) Applicant: CUMMINS FILTRATION IP, INC., Columbus, IN (US)

(72) Inventors: Caryn J. Kindkeppel, Stoughton, WI (US); Brian W. Schwandt, Fort Atkinson, WI (US); Thomas J. Braun, Stoughton, WI (US); Christopher E. Holm, Madison, WI (US); Pathikrit T. Banerjee, Abu Dhabi (AE); Buwa A. Baldeh, Madison, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 15/706,138

(22) Filed: Sep. 15, 2017

(65) Prior Publication Data

US 2018/0001243 A1 Jan. 4, 2018

Related U.S. Application Data

(63) Continuation of application No. 15/236,213, filed on Aug. 12, 2016, now Pat. No. 9,782,708, which is a continuation of application No. 14/052,057, filed on Oct. 11, 2013, now Pat. No. 9,623,351, which is a continuation of application No. 13/299,419, filed on Nov. 18, 2011, now Pat. No. 9,415,333, which is a
(Continued)

(51) Int. Cl.
| | | |
|---|---|---|
| *B01D 35/30* | (2006.01) | |
| *B01D 29/01* | (2006.01) | |
| *B01D 46/00* | (2006.01) | |
| *B01D 46/10* | (2006.01) | |

(52) U.S. Cl.
CPC ............ *B01D 35/30* (2013.01); *B01D 29/01* (2013.01); *B01D 46/0002* (2013.01); *B01D 46/009* (2013.01); *B01D 46/10* (2013.01); *B01D 2201/34* (2013.01); *B01D 2201/4046* (2013.01); *B01D 2201/4053* (2013.01); *B01D 2271/02* (2013.01); *B01D 2271/022* (2013.01)

(58) Field of Classification Search
CPC .................................................... B01D 35/30
See application file for complete search history.

(56) References Cited

U.S. PATENT DOCUMENTS

| | | |
|---|---|---|
| 2,093,877 A | 9/1937 | Von Pentz |
| 2,270,969 A | 1/1942 | Robinson |
| 2,306,325 A | 12/1942 | Allam |

(Continued)

FOREIGN PATENT DOCUMENTS

| | | |
|---|---|---|
| CN | 2296402 Y | 11/1998 |
| CN | 2372041 Y | 4/2005 |

(Continued)

OTHER PUBLICATIONS

First Office Action issued for German Patent Application No. 11 2010 001 567.8, including English language translation, dated May 18, 2017, 12 pages.

(Continued)

*Primary Examiner* — Peter Keyworth
(74) *Attorney, Agent, or Firm* — Foley & Lardner LLP

(57) ABSTRACT

A filtration sealing system is provided for sealing a filter element in a housing at a mating interface therebetween. The sealing system includes a keyed interface. A replacement filter element is provided for such filtration sealing system, with the replacement filter element including a keyed interface.

22 Claims, 7 Drawing Sheets

Related U.S. Application Data continuation of application No. 12/420,884, filed on Apr. 9, 2009, now Pat. No. 8,061,530.

(56) References Cited

U.S. PATENT DOCUMENTS

| | | |
|---|---|---|
| 2,910,332 A | 10/1959 | Madsen et al. |
| 2,915,188 A | 12/1959 | Buker |
| 2,955,028 A | 10/1960 | Bauer |
| 3,025,963 A | 3/1962 | Burns et al. |
| 3,224,592 A | 12/1965 | Burns |
| 3,494,113 A | 2/1970 | Kinney |
| 3,598,738 A | 8/1971 | Biswell et al. |
| 3,645,402 A | 2/1972 | Alexander et al. |
| 3,687,849 A | 8/1972 | Abbott |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,144,169 A | 3/1979 | Grueschow |
| 4,181,313 A | 1/1980 | Hillier et al. |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,572,522 A | 2/1986 | Smagatz |
| 4,589,983 A | 5/1986 | Wydevan |
| 4,600,420 A | 7/1986 | Wydeven et al. |
| 4,617,122 A | 10/1986 | Kruse et al. |
| 4,738,776 A | 4/1988 | Brown |
| 4,755,289 A | 7/1988 | Villani |
| 4,782,891 A | 11/1988 | Cheadle et al. |
| 4,826,517 A | 5/1989 | Norman |
| 4,861,359 A | 8/1989 | Tettman |
| 4,915,831 A | 4/1990 | Taylor |
| 4,925,561 A | 5/1990 | Ishii et al. |
| 4,979,969 A | 12/1990 | Herding |
| 5,024,268 A | 6/1991 | Cheadle et al. |
| 5,050,549 A | 9/1991 | Sturmon |
| 5,069,799 A | 12/1991 | Brownawell et al. |
| 5,094,745 A | 3/1992 | Reynolds |
| 5,120,334 A | 6/1992 | Cooper |
| 5,213,596 A | 5/1993 | Kume et al. |
| 5,222,488 A | 6/1993 | Forsgren |
| 5,223,011 A | 6/1993 | Hanni |
| 5,225,081 A | 7/1993 | Brownawell |
| 5,258,118 A | 11/1993 | Gouritin et al. |
| 5,298,160 A | 3/1994 | Ayers et al. |
| 5,342,511 A | 8/1994 | Brown et al. |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,379 A | 12/1995 | Andress et al. |
| 5,472,463 A | 12/1995 | Herman et al. |
| 5,484,466 A | 1/1996 | Brown et al. |
| 5,494,497 A | 2/1996 | Lee |
| 5,498,332 A | 3/1996 | Handtmann |
| 5,512,074 A | 4/1996 | Hanni et al. |
| 5,531,848 A | 7/1996 | Brinda et al. |
| 5,556,542 A | 9/1996 | Berman et al. |
| 5,560,330 A | 10/1996 | Andress et al. |
| 5,562,825 A | 10/1996 | Yamada et al. |
| 5,569,311 A | 10/1996 | Oda et al. |
| 5,575,826 A | 11/1996 | Gillingham et al. |
| 5,591,330 A | 1/1997 | Lefebvre |
| 5,605,554 A | 2/1997 | Kennedy |
| 5,662,799 A | 9/1997 | Hudgens et al. |
| 5,672,399 A | 9/1997 | Kahlbaugh et al. |
| 5,709,722 A | 1/1998 | Nagai et al. |
| 5,738,785 A | 4/1998 | Brown et al. |
| 5,753,116 A | 5/1998 | Baumann et al. |
| 5,759,217 A | 6/1998 | Joy |
| 5,772,883 A | 6/1998 | Rothman et al. |
| 5,795,361 A | 8/1998 | Lanier et al. |
| 5,803,024 A | 9/1998 | Brown |
| 5,820,646 A | 10/1998 | Gillingham et al. |
| 5,853,439 A | 12/1998 | Gieseke et al. |
| 5,863,424 A | 1/1999 | Lee |
| 5,891,402 A | 4/1999 | Sassa et al. |
| 5,902,364 A | 5/1999 | Tokar et al. |
| 5,948,248 A | 9/1999 | Brown |
| 6,045,692 A | 4/2000 | Bilski et al. |
| D425,189 S | 5/2000 | Gillingham et al. |
| 6,086,763 A | 7/2000 | Baumann |
| 6,096,208 A | 8/2000 | Connelly et al. |
| 6,098,575 A | 8/2000 | Mulshine et al. |
| 6,129,852 A | 10/2000 | Elliott et al. |
| 6,149,700 A | 11/2000 | Morgan et al. |
| 6,171,355 B1 | 1/2001 | Gieseke et al. |
| 6,179,890 B1 | 1/2001 | Ramos et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,231,630 B1 | 5/2001 | Ernst et al. |
| 6,235,194 B1 | 5/2001 | Jousset |
| 6,235,195 B1 | 5/2001 | Tokar |
| 6,238,554 B1 | 5/2001 | Martin et al. |
| 6,238,561 B1 | 5/2001 | Liu et al. |
| 6,261,334 B1 | 7/2001 | Morgan et al. |
| 6,264,833 B1 | 7/2001 | Reamsnyder et al. |
| RE37,369 E | 9/2001 | Hudgens et al. |
| 6,293,984 B1 | 9/2001 | Oda et al. |
| 6,306,193 B1 | 10/2001 | Morgan et al. |
| D450,828 S | 11/2001 | Tokar |
| 6,348,085 B1 | 2/2002 | Tokar et al. |
| D455,826 S | 4/2002 | Gillingham et al. |
| 6,375,700 B1 | 4/2002 | Jaroszczyk et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,402,798 B1 | 6/2002 | Kallsen et al. |
| 6,416,561 B1 | 7/2002 | Kallsen et al. |
| 6,447,566 B1 | 9/2002 | Rivera et al. |
| 6,475,379 B2 | 11/2002 | Jousset et al. |
| 6,478,018 B2 | 11/2002 | Fedorowicz et al. |
| 6,478,019 B2 | 11/2002 | Fedorowicz et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,517,598 B2 | 2/2003 | Anderson et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,827,750 B2 | 12/2004 | Drozd et al. |
| 6,835,304 B2 | 12/2004 | Jousset et al. |
| 6,843,916 B2 | 1/2005 | Burrington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 6,996,940 B2 | 2/2006 | Beasley |
| 7,001,450 B2 | 2/2006 | Gieseke et al. |
| 7,008,467 B2 | 3/2006 | Krisko et al. |
| 7,018,531 B2 | 3/2006 | Eilers et al. |
| 7,070,641 B1 | 7/2006 | Gunderson et al. |
| 7,081,145 B2 | 7/2006 | Gieseke et al. |

(56) References Cited

U.S. PATENT DOCUMENTS

| | | |
|---|---|---|
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke et al. |
| 7,217,361 B2 | 5/2007 | Connor et al. |
| 7,247,183 B2 | 7/2007 | Connor et al. |
| 7,258,719 B2 | 8/2007 | Miller et al. |
| 7,282,075 B2 | 10/2007 | Sporre et al. |
| 7,338,544 B2 | 3/2008 | Sporre et al. |
| 7,351,270 B2 | 4/2008 | Engelland et al. |
| 7,396,375 B2 | 7/2008 | Nepsund et al. |
| 7,491,254 B2 | 2/2009 | Krisko et al. |
| 7,494,017 B2 | 2/2009 | Miller |
| 7,540,895 B2 | 6/2009 | Furseth et al. |
| D600,790 S | 9/2009 | Nelson et al. |
| 7,582,130 B2 | 9/2009 | Ng et al. |
| 7,625,419 B2 | 12/2009 | Nelson et al. |
| 7,645,310 B2 | 1/2010 | Krisko et al. |
| 7,655,074 B2 | 2/2010 | Nepsund et al. |
| 7,674,308 B2 | 3/2010 | Krisko et al. |
| 7,682,416 B2 | 3/2010 | Engelland et al. |
| 7,776,139 B2 | 8/2010 | Schwandt et al. |
| 7,799,108 B2 | 9/2010 | Connor et al. |
| 7,828,869 B1 | 11/2010 | Parikh et al. |
| 7,959,714 B2 | 6/2011 | Smith et al. |
| 7,967,886 B2 | 6/2011 | Schrage et al. |
| 7,972,405 B2 | 7/2011 | Engelland et al. |
| 7,981,183 B2 | 7/2011 | Nepsund et al. |
| 7,993,422 B2 | 8/2011 | Krisko et al. |
| 8,016,903 B2 | 9/2011 | Nelson et al. |
| 8,034,145 B2 | 10/2011 | Boehrs et al. |
| 8,048,187 B2 | 11/2011 | Merritt et al. |
| 8,061,530 B2 | 11/2011 | Kindkeppel et al. |
| 8,062,399 B2 | 11/2011 | Nelson et al. |
| 8,101,003 B2 | 1/2012 | Krisko et al. |
| 8,119,002 B2 | 2/2012 | Schiavon et al. |
| 8,241,383 B2 | 8/2012 | Schrage et al. |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,357,219 B2 | 1/2013 | Boehrs et al. |
| 8,480,779 B2 | 7/2013 | Boehrs et al. |
| 8,496,723 B2 | 7/2013 | Reichter et al. |
| 8,518,141 B2 | 8/2013 | Schrage et al. |
| 8,562,707 B2 | 10/2013 | Nepsund et al. |
| 8,636,820 B2 | 1/2014 | Reichter et al. |
| 8,652,228 B2 | 2/2014 | Krisko et al. |
| 8,709,119 B2 | 4/2014 | Reichter et al. |
| 8,778,043 B2 | 7/2014 | Krisko et al. |
| 8,840,699 B2 | 9/2014 | Bruce et al. |
| 8,906,128 B2 | 12/2014 | Reichter et al. |
| 9,114,346 B2 | 8/2015 | Schrage et al. |
| 2001/0032545 A1 | 10/2001 | Goto et al. |
| 2002/0046556 A1 | 4/2002 | Reid |
| 2002/0060178 A1 | 5/2002 | Tsabari |
| 2002/0073850 A1 | 6/2002 | Tokar et al. |
| 2002/0096247 A1 | 7/2002 | Wydeven |
| 2002/0157359 A1 | 10/2002 | Stenersen et al. |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0184025 A1 | 10/2003 | Matsuki |
| 2003/0218150 A1 | 11/2003 | Blakemore et al. |
| 2004/0035097 A1 | 2/2004 | Schlensker et al. |
| 2004/0040271 A1 | 3/2004 | Kopec et al. |
| 2004/0060861 A1 | 4/2004 | Winter et al. |
| 2004/0091652 A1 | 5/2004 | Kikuchi et al. |
| 2004/0091654 A1 | 5/2004 | Kelly et al. |
| 2004/0140255 A1 | 7/2004 | Merritt et al. |
| 2004/0173097 A1 | 9/2004 | Engelland et al. |
| 2004/0187689 A1 | 9/2004 | Sporre et al. |
| 2004/0221555 A1 | 11/2004 | Engelland et al. |
| 2004/0226443 A1 | 11/2004 | Gillingham et al. |
| 2005/0019236 A1 | 1/2005 | Martin et al. |
| 2005/0166561 A1 | 8/2005 | Schrage et al. |
| 2005/0173325 A1 | 8/2005 | Klein et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0064956 A1 | 3/2006 | Connor et al. |
| 2006/0113233 A1 | 6/2006 | Merritt et al. |
| 2006/0180537 A1 | 8/2006 | Loftis et al. |
| 2006/0213139 A1 | 9/2006 | Stramandinoli |
| 2007/0175815 A1 | 8/2007 | Thomas |
| 2007/0240392 A1 | 10/2007 | Ng et al. |
| 2007/0261374 A1 | 11/2007 | Nelson et al. |
| 2008/0022641 A1 | 1/2008 | Engelland et al. |
| 2008/0107765 A1 | 5/2008 | Considine et al. |
| 2008/0110142 A1 | 5/2008 | Nelson et al. |
| 2008/0250766 A1 | 10/2008 | Schrage et al. |
| 2008/0307759 A1 | 12/2008 | Reichter et al. |
| 2009/0057213 A1 | 3/2009 | Schiavon et al. |
| 2009/0064646 A1 | 3/2009 | Reichter et al. |
| 2009/0090669 A1 | 4/2009 | Holzmann et al. |
| 2009/0126324 A1 | 5/2009 | Smith et al. |
| 2009/0151311 A1 | 6/2009 | Reichter et al. |
| 2009/0193972 A1 | 8/2009 | Schwandt et al. |
| 2010/0043366 A1 | 2/2010 | Boehrs |
| 2010/0051528 A1 | 3/2010 | Derstler et al. |
| 2010/0064646 A1 | 3/2010 | Smith et al. |
| 2010/0065203 A1 | 3/2010 | Tanbour et al. |
| 2010/0077710 A1 | 4/2010 | Severance et al. |
| 2010/0170209 A1 | 7/2010 | Nelson et al. |
| 2010/0186353 A1 | 7/2010 | Ackermann et al. |
| 2010/0258493 A1 | 10/2010 | Kindkeppel et al. |
| 2014/0034565 A1 | 2/2014 | Loken et al. |
| 2014/0096493 A1 | 4/2014 | Kelmartin et al. |
| 2014/0290194 A1 | 10/2014 | Muenkel et al. |
| 2015/0013293 A1 | 1/2015 | Wagner et al. |

FOREIGN PATENT DOCUMENTS

| | | |
|---|---|---|
| CN | 1754612 A | 4/2006 |
| CN | 101374582 A | 2/2009 |
| CN | 201292900 A | 8/2009 |
| DE | 88 08 632 U1 | 9/1988 |
| DE | 29613098 U1 | 9/1996 |
| DE | 10 2008 062 956 | 6/2010 |
| EP | 0 747 579 B1 | 12/1996 |
| EP | 0 982 062 B1 | 3/2000 |
| EP | 1 129 760 B1 | 9/2001 |
| EP | 1 166 843 A1 | 1/2002 |
| EP | 1 208 902 A1 | 5/2002 |
| EP | 1 233 173 B1 | 8/2002 |
| EP | 1 747 053 B1 | 1/2007 |
| FR | 2214505 A | 8/1974 |
| GB | 0 970 826 A | 9/1964 |
| GB | 2 082 932 A | 3/1982 |
| JP | 60-112320 A | 6/1985 |
| JP | H1-163408 A | 6/1989 |
| JP | H1-171615 A | 7/1989 |
| JP | H2-025009 A | 2/1990 |
| WO | WO-2004/054684 | 7/2004 |
| WO | WO-2005/058461 | 6/2005 |
| WO | WO-2005/077487 | 8/2005 |
| WO | WO-2007/009039 | 1/2007 |
| WO | WO-2007/089662 | 8/2007 |

OTHER PUBLICATIONS

International Search Report and Written Opinion issued for PCT/US2017/030386, dated Jul. 26, 2017, 9 pages.

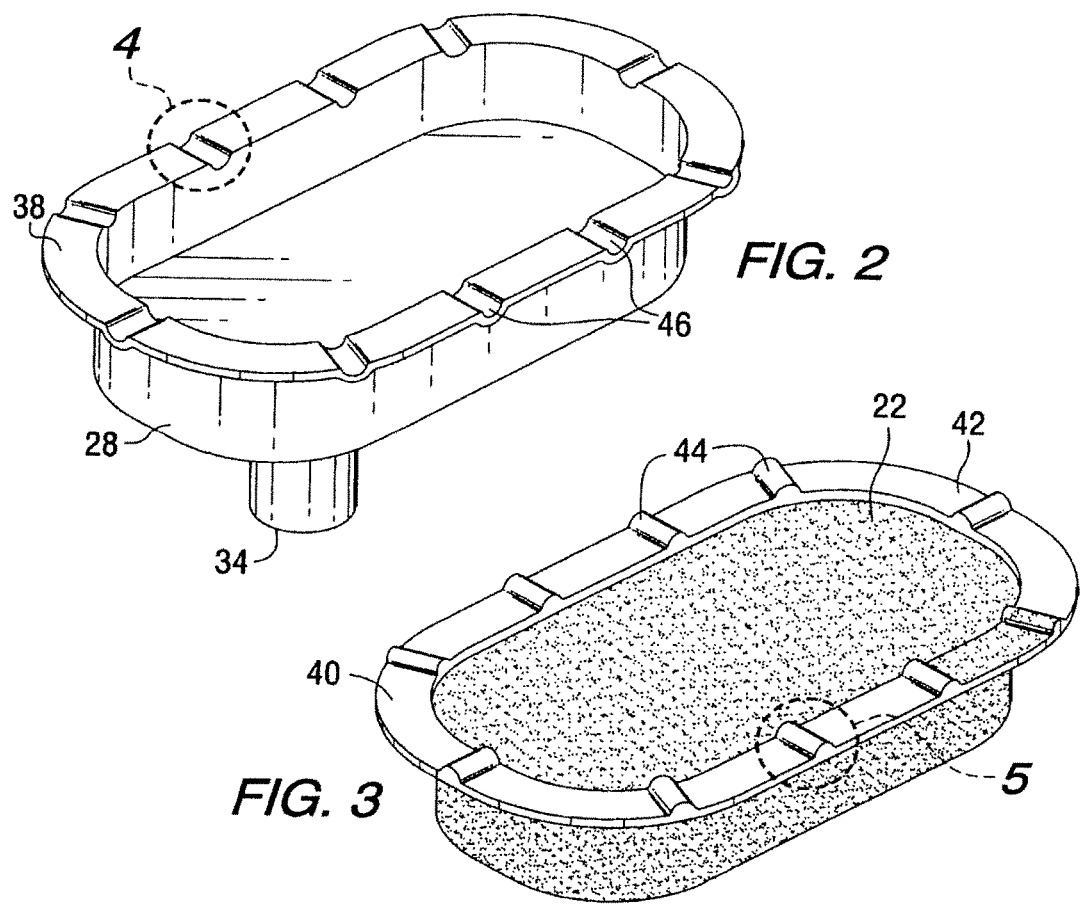
FIG. 2
FIG. 3
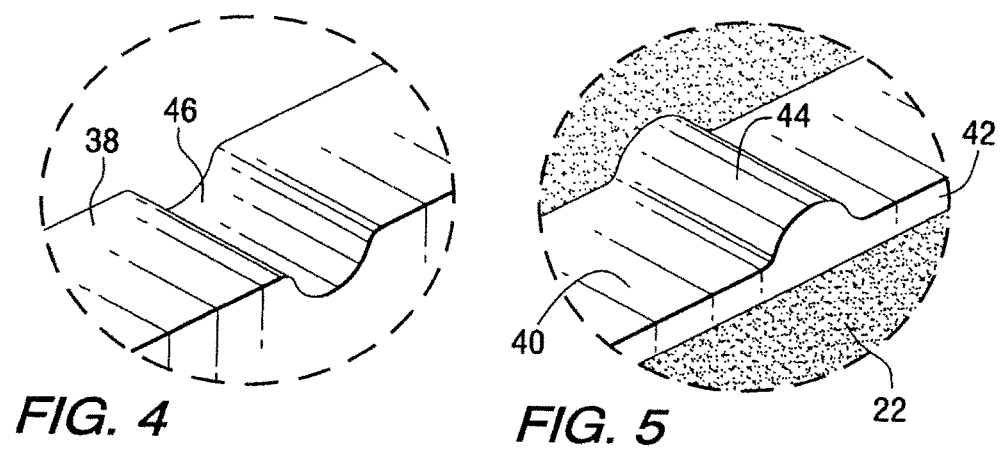
FIG. 4
FIG. 5

FILTRATION SEALING SYSTEM

CROSS-REFERENCE TO RELATED APPLICATIONS

The present application is a continuation of U.S. patent application Ser. No. 15/236,213, filed Aug. 12, 2016, which is a continuation of U.S. patent application Ser. No. 14/052,057, filed Oct. 11, 2013, now U.S. Pat. No. 9,623,351, which is a continuation of U.S. patent application Ser. No. 13/299,419, filed Nov. 18, 2011, now U.S. Pat. No. 9,415,333, which is a continuation of U.S. patent application Ser. No. 12/420,884, filed Apr. 9, 2009 now U.S. Pat. No. 8,061,530. The contents of these applications are incorporated herein by reference in their entirety.

BACKGROUND AND SUMMARY

The invention relates to filtration sealing systems, including filter elements, housings, and replacement filter elements.

Filtration sealing systems are known for sealing a filter element in a housing at a mating interface therebetween. The present invention arose during continuing development efforts in filtration sealing technology, including in the preferred embodiment directed toward improvements in one or more of the following: a system permitting installation or replacement of only an authorized filter element; a system permitting installation or replacement of a filter element only in a given orientation; improved dimensional stability of a gasket and/or housing in sealing relation along a border, a system providing one-way-only fit of a filter element in the housing; replacement filter elements for the above systems; improved sealing along housing ports.

BRIEF DESCRIPTION OF THE DRAWINGS

FIG. 2 is a perspective view of a component of FIG. 1 and illustrating the present invention.

FIG. 3 is a perspective view of a component of FIG. 1 and illustrating the present invention.

FIG. 4 is an enlarged view of a portion of FIG. 2.

FIG. 5 is an enlarged view of a portion of FIG. 3.

DETAILED DESCRIPTION

Figure 1:
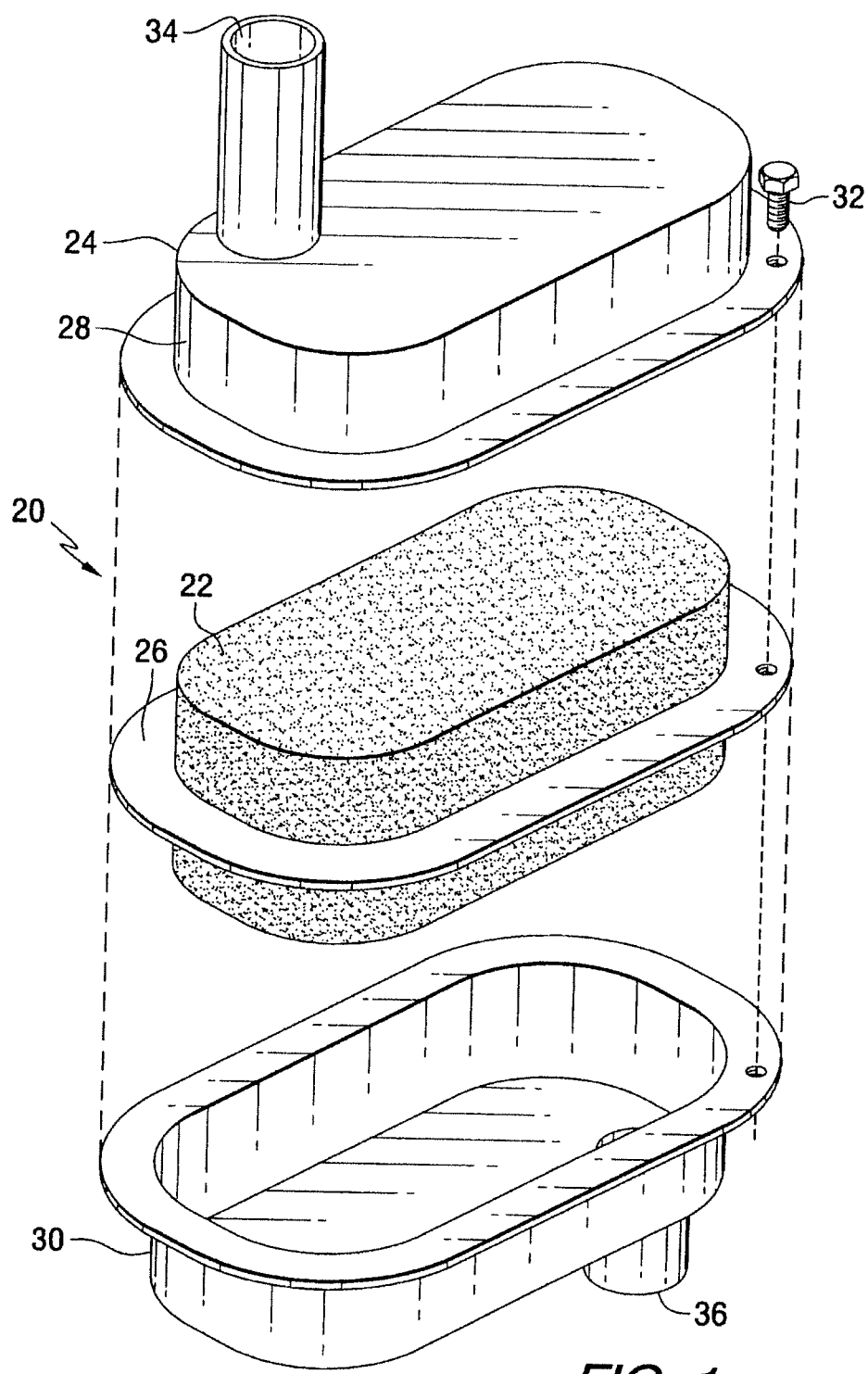
FIG. 1 is an exploded perspective view of a filter element in a housing.

FIG. 1 shows a filtration scaling system 20 for sealing a filter element 22 in a housing 24 at a mating interface such as 26 therebetween, to be described. The housing is provided by mating housing sections 28 and 30 mounted and attached to each other in any suitable manner, such as clamps, bolts (e.g. as shown in dashed line at 32), and so on. The housing has an inlet port 34 for receiving fluid to be filtered, e.g. gas (including air) or liquid, which fluid flows through filter element 22 and is discharged as clean filtered fluid at outlet port 36.

The sealing system includes a keyed interface as shown at 38 in FIGS. 2 and 40 in FIG. 3. FIG. 2 is a perspective view of upper housing section 28 turned over to view the underside thereof. FIG. 3 is a perspective view of filter element 22 having a border 42 which may be composed of gasket material itself or may have a gasket added thereto. Keyed interface 38, 40 permits installation or replacement of only an authorized filter element 22 mating to the mating interface. The keyed interface permits installation or replacement of the filter element only in a given orientation. Filter element 22 and housing section 28 have borders mating with each other at a gasket 42 therebetween and providing the noted mating interface. The gasket and at least one of the housing and the filter element engage each other in detent relation providing the noted keyed interface. In the embodiment of FIGS. 2, 3 gasket 42 extends along an extension direction along a perimeter. The gasket has one or more humped arches such as 44, FIGS. 3, 5, spaced along the perimeter and extending transversely of the noted extension direction. Housing section 28 has one or more concave recessed slits such as 46, FIGS. 2, 4, spaced along the border along the perimeter and extending transversely of the noted extension direction and complementally receiving respective humped arches 44 therein. The arches and slits may be regularly or irregularly spaced, and may be symmetric or non-symmetric around the perimeter. In one embodiment, gasket 42 is in-molded to and integral with filter element 22. The one or more concave recessed slits 46 are in the housing border. The plurality of humped arches 44 and the plurality of concave recessed slits 46 are in complemental detent relation engagement and are selectively spaced along the perimeter to provide dimensional stability of the housing at the gasket in sealing relation along the border. At least one of the sides, shape and spacing of at least the set of one or more humped arches 44 and the set of one or more concave recessed slits 46 is selectively configured to allow a one-way fit of the filter element in the housing to ensure correct installation every time.

Figures 6, 7:
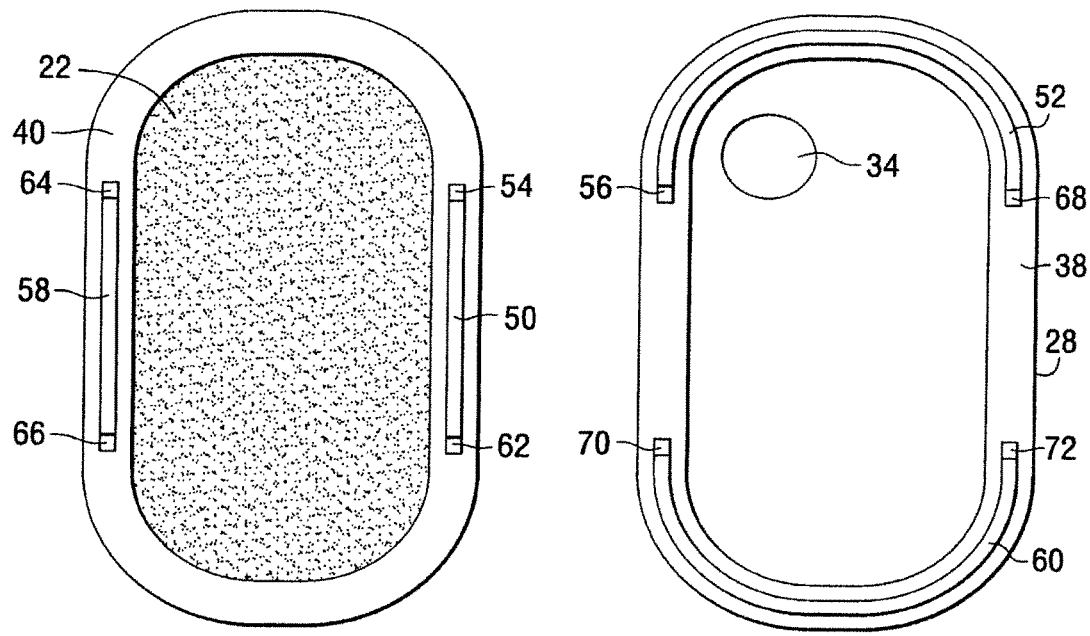
FIG. 6 is an elevation view of an alternate embodiment of a component of FIG. 1 in accordance with the invention.
FIG. 7 is an elevation view of an alternate embodiment of a component of FIG. 1 in accordance with the invention.
Figure 8:
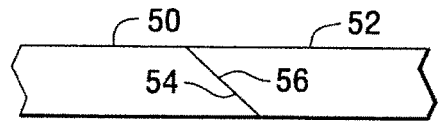
FIG. 8 is a sectional view illustrating mating of the components of FIGS. 6 and 7.

FIGS. 6-8 show a further embodiment and use like reference numerals from above where appropriate to facilitate understanding. At least two gaskets are provided, including a first gasket 50 on the filter element, and a second gasket 52 on the housing. The gaskets engage each other in keyed relation and sealing engagement. The filter element and the housing have borders 40 and 38 mating with each other at two-part gasket 50, 52 therebetween and providing the mating interface. The two-part gasket is provided by at least first gasket 50 and second gasket 52. Gasket 50 has a gasket-engagement surface 54 for engaging gasket 52. Gasket 52 has a gasket-engagement surface 56 for engaging gasket 50. The gasket-engagement surfaces 54 and 56 engage each other in keyed relation providing the keyed interface. The two-part gasket extends along an extension direction along a perimeter. Gasket 50 extends along the extension direction to a beveled end 54 tapered along a first taper along the extension direction. Gasket 52 extends along the extension direction to a beveled end 56 tapered along a second taper along the extension direction. The first and second tapers are opposite and complemental to each other, FIG. 8. The beveled ends at 54 and 56 engage each other in sealed relation at the keyed interface.

In one embodiment, the first gasket includes first and second gasket segments 50 and 58 opposite each other across the perimeter. The second gasket includes third and fourth gasket segments 52 and 60 opposite each other across the perimeter. First gasket segment 50 is between fourth and third gasket segments 60 and 52 along the extension direction along the perimeter. Third gasket segment 52 is between first and second gasket segments 50 and 58 along the extension direction along the perimeter. Second gasket segment 58 is between third and fourth gasket segments 52 and 60 along the perimeter. Fourth gasket segment 60 is between second and first gasket segments 58 and 50 along the extension direction along the perimeter. First gasket segment 50 extends along the extension direction between distally opposite first and second beveled ends 62 and 54 tapered along opposing first and second tapers along the extension direction. Second gasket segment 58 extends along the extension direction between distally opposite third and fourth beveled ends 64 and 66 tapered along opposing third and fourth tapers along the extension direction. Third gasket segment 52 extends along the extension direction between distally opposite fifth and sixth beveled ends 56 and 68 tapered along opposing fifth and sixth tapers along the extension direction. Fourth gasket segment 60 extends along the extension direction between distally opposite seventh and eighth beveled ends 72 and 70 tapered along opposing seventh and eighth tapers along the extension direction. The first and eighth beveled ends engage each other in sealed relation. The second and fifth beveled ends engage each other in sealed relation. The third and sixth beveled ends engage each other in sealed relation. The fourth and seventh beveled ends engage each other in sealed relation.

In some embodiments, the two-part gasket includes only first and second gaskets, with the first gasket extending along the extension direction between distally opposite first and second beveled ends tapered along opposing first and second tapers along the extension direction, and with the second gasket extending along the extension direction between distally opposite third and fourth beveled ends tapered along opposing third and fourth tapers along the extension direction, and with the first and third beveled ends engaging each other in sealed relation, and with the second and fourth beveled ends engaging each other in sealed relation.

Figure 9:
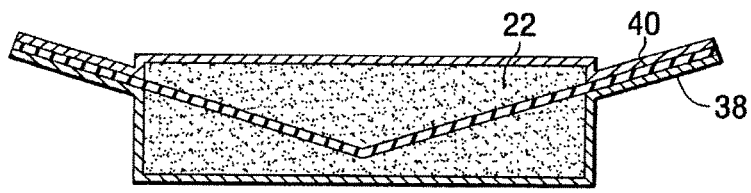
FIG. 9 is like FIG. 8 and shows another embodiment.
Figure 10:
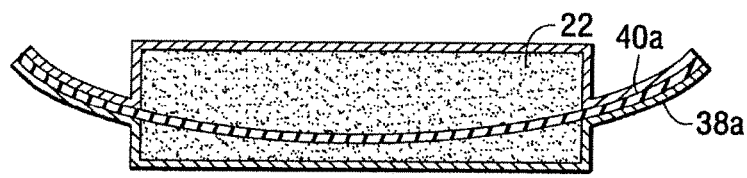
FIG. 10 is like FIG. 9 and shows another embodiment.
Figure 11:
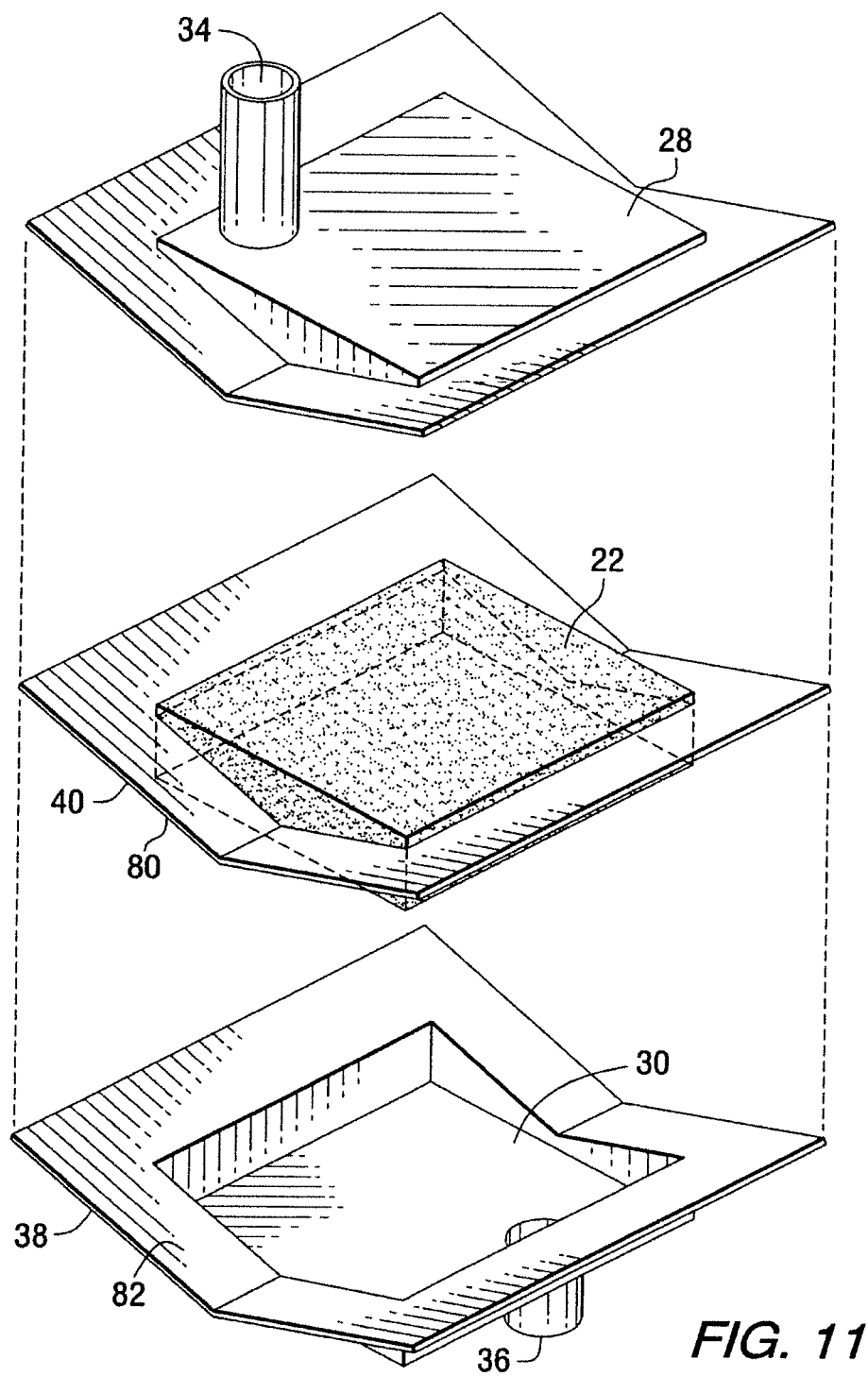
FIG. 11 is like FIG. 1 and further illustrates the embodiment of FIG. 9.
Figure 12:
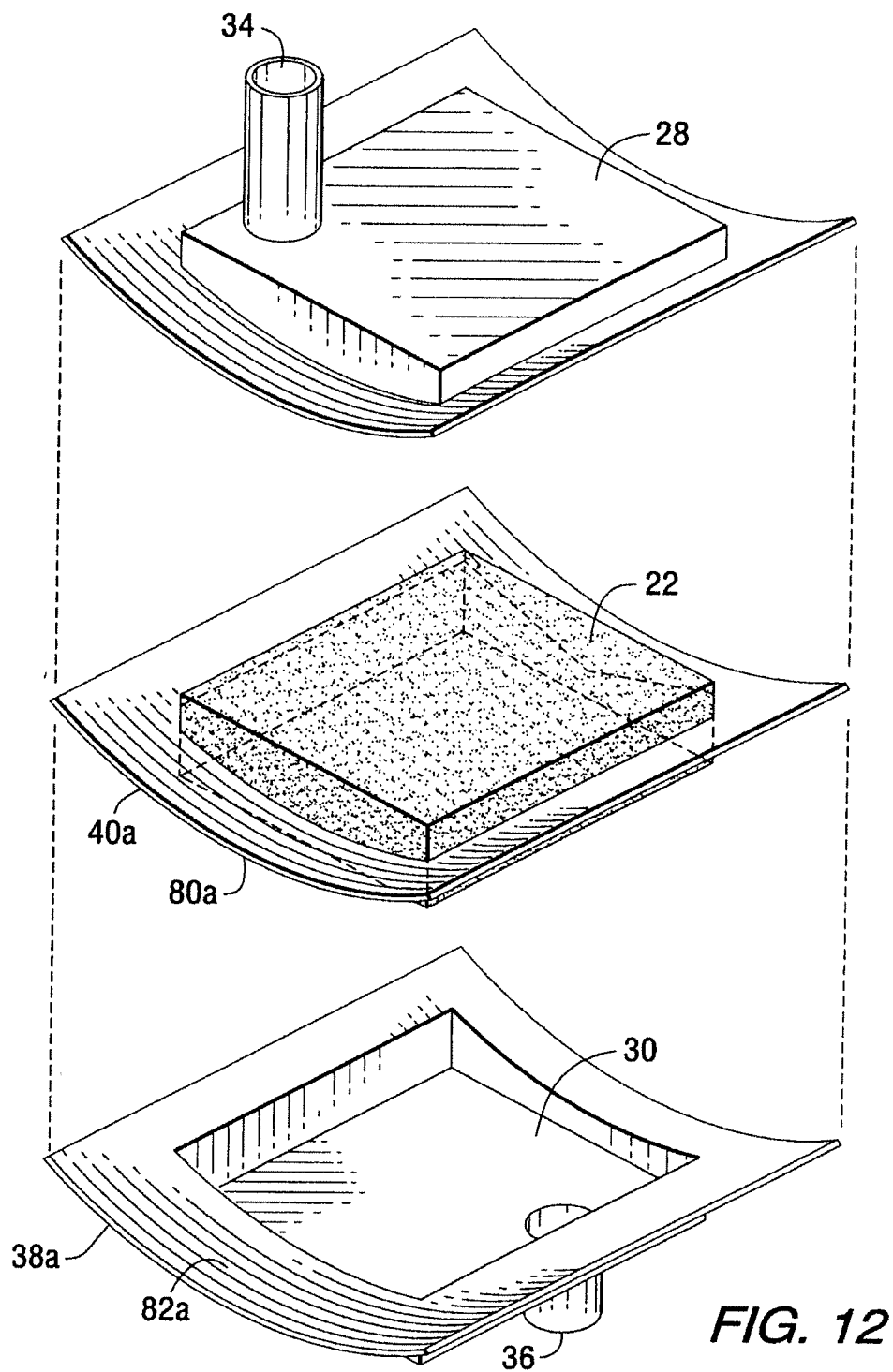
FIG. 12 is like FIG. 1 and further illustrates the embodiment of FIG. 10.

FIGS. 9-12 show further embodiments and use like reference numerals from above where appropriate to facilitate understanding. The filter element and the housing have respective borders 40 and 38 mating with each other at the noted mating interface and extending along an extension direction along a perimeter, FIG. 11. The mating interface has a width extending along a radial direction relative to the perimeter. The mating interface has a length extending along the noted extension direction. The borders have facing surfaces at the mating interface, including a first facing surface 80 on the filter element, and a second facing surface 82 on the housing. At least one of the first and second facing surfaces extends non-rectilinearly along the noted extension direction along the noted length to provide the keyed interface, FIG. 11. In the preferred embodiment, each of the first and second facing surfaces 80 and 82 extends non-rectilinearly along the noted extension direction along the noted length to provide the keyed interface, with one of the facing surfaces, e.g. 82, receiving the other of the facing surfaces, e.g. 80, in nested relation. In FIGS. 9 and 11, the keyed interface has a V-shape in a cross-sectional plane taken transversely to the noted radial direction. In such embodiment, each of the first and second facing surfaces 80 and 82 has the noted V-shape in the noted cross-sectional plane taken transversely to the noted radial direction, with the V-shape of one of the facing surfaces, e.g. 82, being a concave V-shape relative to the interface, and with the V-shape of the other of the facing surfaces, e.g. 80, being a convex V-shape relative to the interface, the one facing surface of concave V-shape receiving the other facing surface of convex V-shape in nested relation. In FIGS. 10 and 12, the keyed interface 40a, 38a, at facing surfaces 80a and 82a has an arcuate shape in a cross-sectional plane taken transversely to the noted radial direction. In the preferred embodiment, each of the first and second facing surfaces 80a and 82a has the arcuate shape in the noted cross-sectional plane taken transversely to the noted radial direction, with the arcuate shape of one of the facing surfaces, e.g. 82a, being a concave arcuate shape relative to the interface, and with the arcuate shape of the other of the facing surfaces, e.g. 80a, being a convex arcuate shape relative to the interface, and with the one facing surface of concave arcuate shape receiving the other facing surface of convex arcuate shape in nested relation.

Figure 13:
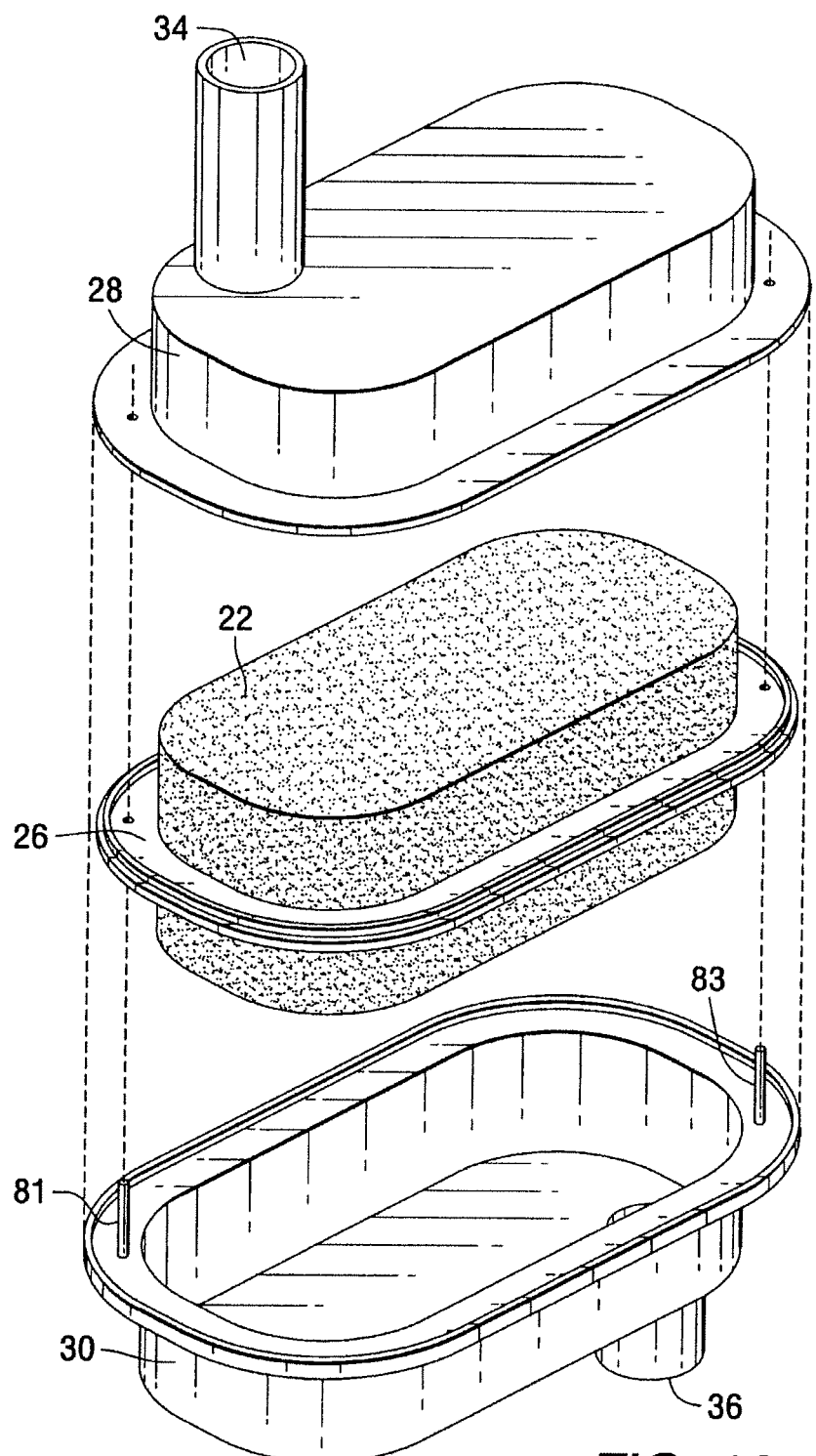
FIG. 13 is like FIG. 1 and shows another embodiment.

FIG. 13 shows another embodiment having one or more mounting pin locators such as 81, 83 along the borders, providing in one embodiment one or more given or specific orientations of the filter element and the housing. In another embodiment, the one or more mounting pin locators provide one-way-only fit of the filter element in the housing. In another embodiment, the one or more mounting pin locators provide replacement of only an authorized replacement filter element.

Figure 14:
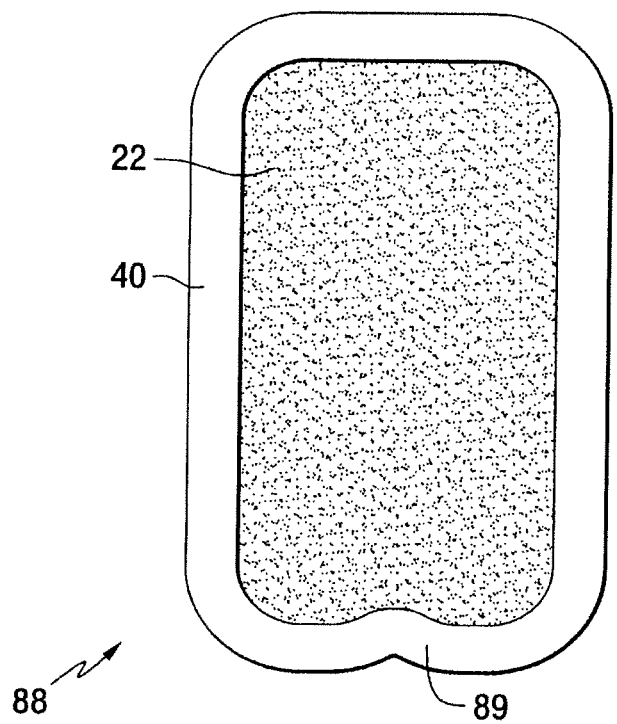
FIG. 14 is like FIG. 6 and shows another embodiment.

In further embodiments, the filter element and the housing have borders 40 and 38 mating with each other at a seal at the mating interface and extending along the extension direction along a perimeter defining an engagement plane, with each border and the seal having a non-symmetrical shape in the noted engagement plane, such as non-symmetrical shape 88 in FIG. 14, or other non-non-symmetrical shapes. In one embodiment, the seal is provided by a gasket 89, and the gasket follows a non-symmetrical profile. In a further embodiment, the non-symmetrical profile of gasket 89 reduces volume of the housing. In one embodiment, the border has a portion with a heart shape segment, for example as shown at 89. The borders on the filter element and the housing are complemental to each other in the engagement plane, which in combination with non-symmetry provides one-way-only fit of the filter element in the housing. In a further embodiment, the filter element and the housing have borders mating with each other at the mating interface and extending along the extension direction along a perimeter defining an engagement plane and are configured to provide one-way-only fit of the filter element in the housing.

Further in the preferred embodiment, a replacement filter element 22 is provided for the noted filtration sealing system wherein the replacement filter element includes the noted keyed interface. The filter element includes a keyed border providing the keyed interface.

Further in the preferred embodiment, a filtration sealing system is provided for a filter having a filter element in a housing having at least two sections, the filter element being a first member, the housing sections including second and third members, wherein at least two of the noted members meet at a mating interface, and with the sealing system being a keyed said interface.

Figure 15:
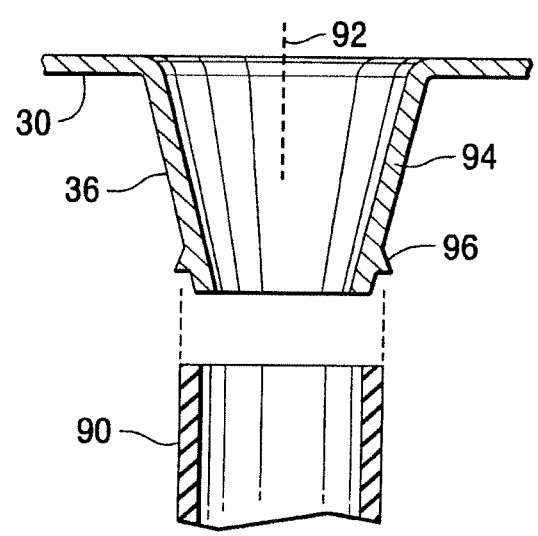
FIG. 15 is an exploded sectional view of a portion of a component of FIG. 1 and illustrating the present invention.

The preferred embodiment of the invention further provides a filtration sealing system for a filter having a filter element in a housing having a housing port 36, FIG. 15, connected to a flow conduit 90 for fluid flow therebetween along a flow direction (downwardly in FIG. 15). Port 36 has a length extending along the flow direction, and a width transverse to such length. The width of the port varies along the length of the port, preferably providing a lead-in for assembly into the flow conduit. The port extends longitudinally along a longitudinal axis 92 along the length and has a tapering sidewall 94 which tapers as it extends longitudinally. Tapering sidewall 94 provides the noted varying width. Port 36 tapers frustoconically along tapering sidewall 94. The tapering sidewall has one or more sealing tabs 96 engaging flow conduit 90 in mechanical wiper sealing relation. Conduit 90 may be a resilient flexible material, e.g. rubber, which may stretch as it fits over and around sidewall 94 and sealing tab 96, or conduit 90 may have a frustoconical taper complemental to the frustoconical taper of sidewall 94.

In a further embodiment, the gasket and the housing are configured such that a new gasket may optionally be supplied every time the filter element is replaced. In a further embodiment, the gasket and the housing are configured such that a new gasket must be replaced every time the filter element is replaced. This reduces concern of the gasket taking a compression set over time at the housing and leaking when it interfaces with the filter element. The housing may be provided with one or more snap-fit slits or grooves for receiving the replaceable gasket.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for filter element installation, comprising:
    positioning a filter element between a first housing section and a second housing section, the first housing section having a first housing section border therearound, the second housing section having a second housing section border therearound, the filter element including filter media and a filter element border extending from the filter media in an x-y plane;
    mating the filter element with the first housing section and the second housing section at a mating interface between the filter element border and the first and second housing section borders, a first side of the filter element border engaging the first housing section border and a second, opposite side of the filter element border engaging the second housing section border, one of the first side of the filter element border and the second side of the filter element border comprising one or more axial projections projecting in a z-direction that is perpendicular to the x-y plane, a circumferential surface of the filter element border comprising a radially extending recess in the x-y plane,
    wherein one of the first housing section border and the second housing section border includes one or more axial recesses recessed in the z-direction and complementally receiving the one or more axial projections therein;
    wherein one of the first housing section border and the second housing section border includes an inner housing surface complementary with the circumferential surface of the filter element border; and
    wherein the filter element border is sealed along the mating interface, including being sealed at all of the one or more axial projections and all of the one or more axial recesses, and blocks fluid flow across the filter element border, including blocking fluid flow across the one or more axial projections and the one or more axial recesses.

2. The method of claim 1, wherein the one or more axial projections comprises a plurality of axial projections, and the one or more axial recesses comprises a plurality of axial recesses.

3. The method of claim 2, wherein the plurality of axial projections are spaced at regular intervals along the filter element border.

4. The method of claim 2, wherein the plurality of axial projections are spaced at irregular intervals along the filter element border.

5. The method of claim 2, wherein the plurality of axial projections comprise a plurality of humped arches.

6. The method of claim 5, wherein the plurality of axial recesses comprise a plurality of concave recessed slits.

7. The method of claim 6, wherein the filter element border comprises a gasket that is formed integral with a remainder of the filter element.

8. The method of claim 1, wherein the radially extending recess defines a heart shape segment in the filter element border.

9. The method of claim 1, wherein the filter media possess a racetrack-shaped cross-section.

10. The method of claim 9, wherein the plurality of axial projections are spaced at regular intervals along the filter element border.

11. The method of claim 1, wherein the filter element border comprises a gasket that is formed integral with a remainder of the filter element.

12. The method of claim 1, wherein the radially extending recess is positioned so as to result in the filter element border possessing a non-symmetrical shape in the x-y plane.

13. A method for filter element installation, comprising:
    positioning a filter element between a first housing section and a second housing section, the first housing section having a first housing section border therearound, the second housing section having a second housing section border therearound, the filter element including filter media and a filter element border extending from the filter media in an x-y plane;
    mating the filter element with the first housing section and the second housing section at a mating interface between the filter element border and the first and second housing section borders, a first side of the filter element border engaging the first housing section border and a second, opposite side of the filter element border engaging the second housing section border, one of the first side and the second side of the filter element border comprising a plurality of axial projections projecting in a z-direction that is perpendicular to the x-y plane,
    wherein one of the first housing section border and the second housing section border includes a plurality of axial recesses recessed in the z-direction and complementally receiving the plurality of axial projections therein;

wherein one of the first housing section border and the second housing section border includes an inner housing surface complementary with a circumferential radial surface of the filter element border so as to form a one-way-only fit of the filter element and the housing, wherein the one-way-only fit is facilitated by a radially extending recess in the x-y plane of the circumferential radial surface of the filter element border; and wherein the filter element border is sealed along the mating interface, including being sealed at all of the plurality of axial projections and all of the plurality of axial recesses, and blocks fluid flow across the filter element border, including blocking fluid flow across the plurality of axial projections and the plurality of axial recesses.

14. The method of claim 13, wherein the plurality of axial projections are spaced at regular intervals along the filter element border.

15. The method of claim 14, wherein the plurality of axial projections comprise a plurality of humped arches.

16. The method of claim 13, wherein the plurality of axial projections are spaced at irregular intervals along the filter element border.

17. The method of claim 16, wherein the plurality of axial projections comprise a plurality of humped arches.

18. The method of claim 13, wherein the filter media possess a racetrack-shaped cross-section.

19. The method of claim 13, wherein the filter element border defines a heart shape segment therein extending in the x-y plane.

20. The method of claim 13, wherein the filter element border comprises a radially extending recess, the radially extending recess positioned so as to result in the filter element border possessing a non-symmetrical shape in the x-y plane.

21. The method of claim 20, wherein the plurality of axial projections are spaced at regular intervals along the filter element border.

22. The method of claim 13, wherein the filter element border comprises a gasket that is formed integral with a remainder of the filter element.

* * * * *